United States Patent
Hansen et al.

(10) Patent No.: US 7,997,892 B2
(45) Date of Patent: Aug. 16, 2011

(54) MOULDING DEVICE AND METHOD OF GENERATING A CAST OF AN INNER SURFACE OF A TUBULAR MEMBER

(75) Inventors: Peder Bent Hansen, Malmö (SE); Torben Klit Pedersen, Værløse (DK); Finn Dalhoff, Herlev (DK)

(73) Assignee: Force Technology, Brondby (DK)

( * ) Notice: Subject to any disclaimer, the term of this patent is extended or adjusted under 35 U.S.C. 154(b) by 448 days.

(21) Appl. No.: 11/990,043

(22) PCT Filed: Aug. 9, 2006

(86) PCT No.: PCT/DK2006/000432
§ 371 (c)(1),
(2), (4) Date: Jul. 3, 2008

(87) PCT Pub. No.: WO2007/016926
PCT Pub. Date: Feb. 15, 2007

(65) Prior Publication Data
US 2010/0164142 A1    Jul. 1, 2010

(30) Foreign Application Priority Data

Aug. 9, 2005 (DK) ................................ 2005 01126

(51) Int. Cl.
*B29C 39/26* (2006.01)
*B29C 39/36* (2006.01)
(52) U.S. Cl. ......... 425/416; 425/422; 425/457; 425/460
(58) Field of Classification Search ............... 425/457, 425/416, 422, 460
See application file for complete search history.

(56) References Cited

U.S. PATENT DOCUMENTS

| | | | |
|---|---|---|---|
| 2,618,014 A | 11/1952 | Sawyer |
| 3,966,871 A | 6/1976 | Schroder |
| 4,303,608 A | 12/1981 | Ticker et al. |
| 5,344,302 A | 9/1994 | Beehler et al. |

FOREIGN PATENT DOCUMENTS

DE    23 58 802    5/1975

(Continued)

OTHER PUBLICATIONS

Flexible Interior-Impression-Molding Tray, Marshall Space Flight Center, Alabama, Aug. 1, 1991—p. 661.

*Primary Examiner* — Yogendra N Gupta
*Assistant Examiner* — Alison Hindenlang
(74) *Attorney, Agent, or Firm* — Day Pitney LLP

(57) ABSTRACT

This invention is related to a moulding device (90; 92; 95; 98; 100; 110) arranged to be positioned inside a tubular member (17). The moulding device (90; 92; 95; 98; 100; 110) comprises a second closing part (1), a shaft (6) loosely connected to the second closing part (1) and able to glide snugly through an opening in a first closing part (7, 8). When inserted into the tubular member (17), the moulding device (90; 92; 95; 98; 100; 110) defines a chamber together with the inner surfaces of thereof. To form a cast, this chamber is filled with moulding material which thereafter cures. To remove the cast and the moulding device (90; 92; 95; 98; 100; 110) from the tubular member, a drawing force is applied to the first closing part (7, 8), which provides a pulling out of the rest of the moulding device (90; 92; 95; 98; 100; 110) and the cast.

12 Claims, 9 Drawing Sheets

FOREIGN PATENT DOCUMENTS

| | | |
|---|---|---|
| EP | 0 337 700 | 10/1989 |
| FR | 2 612 833 | 9/1988 |
| GB | 2 155 390 | 9/1985 |
| GB | 2 366 620 | 3/2002 |
| JP | 11 352051 | 12/1999 |
| JP | 2003 255074 | 9/2003 |
| JP | 2003 262695 | 9/2003 |

MOULDING DEVICE AND METHOD OF GENERATING A CAST OF AN INNER SURFACE OF A TUBULAR MEMBER

FIELD OF THE INVENTION

The invention relates to a moulding device arranged to be placed at least partly inside a tubular member, comprising a first closing part with a first opening. The invention moreover relates to a method of generating a cast of an inner surface of a tubular member.

BACKGROUND OF THE INVENTION

Devices for moulding cast imprints of a section of the inner surface of a tubular member exist. Known devices typically comprise two sealing parts connected by a rod or a shaft. The relative positions of the two sealing parts are fixed by the rod or shaft connecting them, and when the device is inserted inside a tubular member, the two sealing parts seal off a section of the tubular member in which section an imprint of the inner surface thereof are to be moulded. In the following, the sealing part, which is inserted the furthest inside the tubular member is denoted the farthest sealing part, whilst the other sealing part is denoted the closest sealing part.

A moulding mass is injected through a passage in one of the sealing parts or through the connecting rod/shaft and into the confined space between the two sealing parts. Subsequently, the moulding mass is left for some time to cure into a cast containing an imprint of the inner surface of the tubular member.

When the cast has to be removed, it is simply pulled out by drawing the rod/shaft connected to the sealing parts. Since the rod/shaft is connected to the sealing parts, the drawing of the rod/shaft produces a force applied by the farthest sealing part to the cast, which causes the cast to be pushed out by the farthest sealing part. However, since the cast typically is more or less flexible/elastic, the pushing force on the cast and the friction between the cast and the section of the inner surface of the tubular member will cause the cast to compress, thereby tending to increase the diameter thereof. This will increase the risk of damaging the cast imprint of interest and of breaking the connecting rod/shaft, thereby leaving the cast and part of the moulding device inside the tubular member, which will necessitate a time consuming recovery operation.

The above problems are increased, if the tubular member comprises a section with reduced dimensions which should be passed by insertion of the moulding device. The cast would have to be reduced in diameter to pass by the section of the tubular member with reduced dimensions, but drawing the connection rod/shaft provides a compression of the cast and therefore an expansion of its diameter. Naturally, the severity of this problem increases with increased reduction of the dimensions of the tubular member.

EP 0 337 700 A2 describes a moulding device arranged to be inserted inside a tubular member, comprising a shaft (230) having an outlet port (410) and two flanges (250, 260), where the two flanges (250, 260) are arranged to fit tightly inside the tubular member and where the outlet port (410) is placed between the two flanges (250, 260). When a moulding material has been injected and cured to form a cast, the moulding device is removed together with the cast from the inside of the tubular member by pulling the distal end of the shaft, thereby applying a pushing force on the farthest end of the cast, which results in the similar problems of compressing and eventually damaging the cast as described above.

U.S. Pat. No. 2,618,014 discloses a moulding device to be inserted into a tubular structure e.g. in order to detect a defect in said tubular structure. The device comprises a heating housing element (23) for heating a tubular plastic element (25) placed on and fastened to an inflatable expander element (24). Said inflatable expander element (24) is inflated by air pressure. The device further comprises a flexible tube (26) for positioning of elements (23), (24) and (25). A replica of the tubular structure is made by heating the tubular plastic element (25) in the heating housing element (23) and pushing the expander element (24) and tubular plastic element (25) to the area of the tubular structure to be examined. The expander element (24) is expanded using air pressure and thereby the tubular plastic element (25) is forced against the tubular structure to make a replica thereof. After cooling of the tubular plastic element (25), the air pressure is bled from the expander element (24) and the device is removed from the tubular structure using the flexible tube (26). A problem of the presented solution is how to assure the withdrawing of the replica after casting e.g. how to ensure that the replica is not lost in the tube during withdrawal.

U.S. Pat. No. 3,966,871 discloses a method and apparatus for inspection of tubular cavities e.g. in a pressurized-water reactor steam generator. The apparatus comprises an inlet (3) for a moulding mass, a leading dam (2a) comprising a first closing disk (21a) and a trailing dam (2b) comprising a second closing disk (21b). The dams may be inflatable. A tube (4a) serves as an interconnection between leading dam (2a) and trailing dam (2b) and further as an inflation tube for the leading dam (2a). Likewise a tube (4b) may serve as an inflation tube for the trailing dam (2b). The inlet (3) is comprised by the second disk (21b) and an outlet vent (5) is comprised by the first disk (21a). The trailing dam (2b) and the leading dam (2a) together with the tubular cavity define a sealed volume into which moulding mass may be injected. When injected moulding mass injected into a volume defined by the two dams (2a, 2b) has cured into a replica of the tubular cavity, the replica is removed from the tubular cavity by pulling either the inlet (3), which is connected to the leading dam (2a) through (4a), or one of the inflation tubes, (4a) or (4b), the latter being connected to the leading dam (2a) through (4a). The result of pulling the leading dam (2a) is that a pushing force is applied on the farthest end of the cast/replica (leading dam end), which results in the similar problems of compressing and eventually damaging the cast as described above.

FR 2612833 discloses a method and apparatus for making an imprint of an internal thread in a bore, said apparatus comprising a central axis (906) and inflatable water-proof joints (911). A moulding mass (resin) is introduced into a volume defined by the thread (902) and the inflatable joints (911) being in an inflated state. After curing of the moulding mass into a replica of the thread, the inflatable joints (911) are deflated and collapsed towards the central axis (906) with the help of cables (916), thereby detaching the replica from the thread and enabling an extraction of the replica from the bore. A problem of the presented solution is how to assure the withdrawing of the replica after casting e.g. how to ensure that the replica is not lost in the bore during withdrawal.

UK 2,155,390 discloses a method and apparatus for testing tube surfaces, said apparatus comprising a pair of moles (30, 31), a cylindrical plug (13) with a circular cross-section provided with a longitudinal flat surface (14) extending the length of the plug, control cables (26) attached to the plug (13), a moulding mass, wire gaze (22), control cables (27) for the moulding mass, and a loading rod (17). The moles (30, 31) are entered into the tube of which the surfaces are to be tested.

The plug (13), entered to the tube using the loading rod (17), is made to rest on the moles (30, 31). Moulding mass is entered into the volume formed by the tube and the longitudinal flat surface (14) of the plug (13). After curing of the moulding mass into a replica of the surface of the tube, the plug is removed using the control cables (26). The replica is removed from the tube by using the control cables (27) connected to the wire gaze (22) embedded into the replica. A problem of the presented solution is how to assure the withdrawing of the replica after casting e.g. how to ensure that the replica is not lost in the tube during withdrawal.

SUMMARY OF THE INVENTION

It is therefore an object of the invention to provide a moulding device overcoming the above problems. It is thus an object of the invention to provide a moulding device arranged to generate a cast of the surface of the inside of a tubular member and to facilitate a reliable removal of the cast from the inside of the tubular member with reduced risk of damaging the cast during the removal. It is moreover an object of the invention to provide a moulding device capable of generating a cast of a tubular member having a section with decreased dimensions, where the cast comprises imprints of a section of the tubular member on the furthest side of the section with decreased dimensions as seen from the entry opening into the tubular member through which the moulding device is inserted.

These and other objects are achieved, when the moulding device mentioned in the opening paragraph is characterized in that the first closing part is arranged to be placed at least partly inside the tubular member and to seal against the inside of the tubular member in its position at least partly inside the tubular member; and in that the first closing part defines a cavity comprising the first opening and a second opening, where the first and second openings are placed on opposite sides of the first closing part. The moulding device is thus arranged to be placed at least partly inside a tubular member and to seal off against the inner surface(s) of the tubular member. Moulding mass can be introduced through the first opening of the first closing part of the moulding device. The cavity formed in the first closing part renders it possible to create a cast having a part thereof formed in the cavity. The part of the cast formed in the cavity of the first closing member is advantageous, in that it can be used in the removal of the cast from the tubular member, in that it forms a kind of gripping or handling part of the cast. Thus, the moulding device is arranged for creating a part of a cast, to which part a pulling or drawing force can be applied (via the first closing part), so that the cast can be removed from the tubular member by drawing or pulling it out.

The chamber and the second opening should be dimensioned in proportion to the dimensions of the tubular member and the size of the cast to be moulded, so that a pulling or drawing force can be applied to pull out the cast and/or the moulding device without damaging it/them.

The first closing part comprises a first side comprising the first opening and typically arranged to extend across the opening of the tubular member. Moreover, the first closing part comprises an "opposite side", which is meant to denote a second side, which is arranged to extend at least substantially across the opening of the tubular member and which is at a distance from the first side. Finally, the first closing part comprises one (if it is circular in cross section) or more sides arranged to abut and/or to seal against the tubular member. It should be noted, that the first and opposite side of the first closing part not necessarily are parallel with each other or perpendicular to the inside of the tubular member.

It should be noted, that the moulding device of this invention is arranged to facilitate the generation of a cast of the inside/inner surface/wall(s) of a tubular member. This moulding is performed after position of the moulding device at least partly inside the tubular member, where the moulding device is arranged to seal against the inside/wall(s) of the tubular member. Subsequently, moulding material is introduced into the tubular member and is left to cure or harden for a predetermined amount of time. When this moulding material has cured to a cast, this cast contains an imprint of the inside surface/wall(s) of the tubular member and can be inspected to give indications of cracks and other defects of the surface.

Moreover, it should be noted, that the first closing part could be provided with handling means for gripping and drawing the first closing part.

The moulding device can be used for generating a cast of the inside of an end part of a closed tubular member as well as for generating a cast of a section of a tubular member, which section is not limited by an end of the tubular member.

In a preferred embodiment of the moulding device, the first closing part comprises a cup part having said first opening and a lid part having said second opening, where said lid part is arranged to be connected to the cup part, so that the cup part and the lid part together form said cavity.

Hereby, moulding material introduced into the cavity cures to a part of the cast adapted to remain inside the first closing part during application of a drawing force to the first closing part. Hereby, pulling out the first closing part from the tubular member results in pulling out the entire cast from the tubular member with a higher degree of certainty. It should be noted that the term "connected to" as used in the above is meant to denote that the cup part and the lid part are fixed or fastened to each other or held together securely. However, the cup part and the lid part are typically able to be disconnected from each other, e.g. by means of a tool.

Preferably, said first closing part comprises at least one recess. This has shown to add to the certainty of pulling out the entire cast from the tubular member, when the first closing part is pulled out.

In a preferred embodiment, the moulding device moreover comprises a second closing part arranged to be placed inside said tubular member and comprising a passageway; and a shaft arranged to be placed at least partly inside said tubular member and comprising a channel with two ends, whereof a first end is arranged to be an inlet for letting moulding material into the channel and whereof a second end is arranged to be an outlet for letting out moulding material from the channel, wherein said shaft is arranged to fit loosely together with said second closing part so that said passageway and said channel are in communication, wherein said shaft is able to slide snugly through said first opening of said first closing part, and wherein said shaft is able to pass through said second opening of said first closing part leaving an intervening space between said second opening and said shaft.

The shaft provides a channel, which renders it possible to introduce moulding material into the tubular member in some distance from the first closing part, via the passageway in the second closing part. This passageway renders it possible to direct the moulding material introduced in a preferred direction, e.g. perpendicular to the inside of the tubular member.

Since the shaft is arranged to fit loosely together with the second closing part and is arranged to slide snugly through the first opening in the first closing part and pass through said second opening in the first closing part leaving an intervening space or gap between said second opening and said shaft, the three parts of the moulding device are connected loosely. Hereby, if a moulding material has been introduced into the tubular member to at least partly enclose the first and second closing part and the shaft, and when the moulding material has subsequently cured or hardened to a cast, the cast can be removed from the inside of the tubular member together with the parts of the moulding device by drawing the first closing part. This drawing of the first closing part results in a drawing force applied to the cast in that end thereof which is closest to the opening of the tubular member, through which the moulding device is inserted and removed. When a drawing force is applied to the cast instead of a pushing force, the cast tends to be extended in its longitudinal dimension (i.e. the dimension along the length of the tubular member) and to be decreased in its transverse dimension (i.e. the dimension perpendicular to the length of the tubular member). This facilitates the removal of the cast, in that it tends to loosen its contact with/frictional force against the inside surface of the tubular member rendering it easier to remove it from the inside of the tubular member, also when the tubular member comprises a section with decreased dimensions.

In yet a preferred embodiment of the moulding device, the first and second closing part in combination or said first closing part are/is arranged to define a chamber together with the inside of the tubular member, when said moulding device is placed at least partly inside said tubular member.

When the first closing is arranged to define a chamber together with the inside of the tubular member, the moulding device is suitable for taking a cast of an end of a tubular member, in that the end of the tubular member then forms a part of the chamber. When the inside of the tubular member and the first and second closing members in combination are arranged to define a chamber, the moulding device is suitable for taking a cast of a section of the tubular member, where the section is not limited by an end wall of the tubular member (e.g. if the tubular member is not closed or if the tubular member is closed, but longer than the required cast).

Typically, the dimensions of the first closing part substantially correspond to the dimension of the inside of the tubular member, so that placing of the first closing part at least partly inside said tubular member results in the first closing part abutting against the inside of said tubular member. However, the first closing part could comprise a seal for sealing off against the inside of said tubular member. If the moulding device is intended to be used to make a cast of a section of a tubular member, the second closing part is also arranged to abut against the inside of the tubular member. Of course, the second closing part could also comprise a seal for sealing off against the inside of said tubular member.

It should be noted that the moulding device can be dimensioned for generating casts of tubular members of substantially any cross sectional form, such as rectangular, triangular, circular, etc.

In an embodiment of the invention, the moulding device further comprises a core of flexible material arranged to be placed inside said chamber. The flexibility of the core contributes to the flexibility of the cast and thereby renders it easier to remove the cast from the tubular member if the flexibility of the core is greater than the flexibility of the cast. The core should be formed so that it is placed inside the chamber, but without being in contact with the inner surface of the tubular member; hereby, the core does not disturb the moulding of a cast of the surface of the tubular member. Typically, the core is placed on the shaft or on the first or first closing part and is inserted into the inside of the tubular member together with the remainder of the moulding device.

After introduction of moulding material and curing thereof to a cast, the cast connects the parts of the moulding device, including the core, so that the parts of the moulding device all can be removed from the inside of the tubular member by pulling the first closing part out from the tubular member.

In a preferred embodiment, the core comprises a plurality of discs. These discs are typically arranged to be placed on the shaft and/or on the first and/or the first closing part, typically side by side. After introduction of moulding material to the chamber and curing thereof to a cast, the cast keeps the core, the first and second closing member and the shaft together. When a drawing or pulling force is applied to the second closing member, the discs of the core tend to separate slightly from each other, thereby contributing to the longitudinal extension of the cast (i.e. in the longitudinal direction of the tubular member). This aids in the removal of the cast from the tubular member in that the frictional force between the cast and the tubular member is decreased.

In yet another preferred embodiment of the moulding device according to invention, said first closing part comprises an outlet arranged for letting out fluid and/or excess moulding mass. Hereby, the moulding device can be placed inside tubular members submerged into and/or filled with fluid, in that any fluid trapped inside the chamber formed by the moulding device and the tubular member has the possibility to escape or to be drained from the chamber. Even if the tubular member is not submerged into or filled with fluid, the outlet ensures the quality of the cast, in that any gas present in the chamber could possibly disturb the quality of the cast, e.g. by forming gas bubbles inside the chamber. Typically, the outlet is placed in that part of the first closing part which is arranged to be the substantially uppermost part, when the moulding device is placed at least partly inside the tubular member. Hereby, any fluid inside the chamber can be pushed out by introducing moulding mass into the chamber, without the risk of being trapped in a part of the chamber without outlet.

In yet another embodiment of the moulding device, the first closing part moreover comprises a test piece with a surface defect having well known characteristics. This test piece can be placed at the cup part or at the lid part of the first closing part. The surface of the cast which results from the moulding material which has been adjacent to the test piece will thus comprise an imprint of the test piece. Thus, if the test piece is known to have a characteristic of a predetermined size, such as 1 µm, the presence or absence of an imprint of this characteristic indicates whether the quality of the cast is adequate to detect flaws/defects/characteristics of this predetermined size. Thus, a reliable quality control is achieved.

According to another embodiment of the moulding device, the first closing part moreover comprises a mark arranged for generating an imprint on a cast to indicate the orientation of the moulding device with relation to a known orientation. The mark is typically placed at the surface of the cup part or of the lid part of the first closing part, and the mark could be an indentation on the surface of the cup part or of the lid part. The mark permanently marks a reference position in the cast so that the position of imprints of defects of the surface can be determined unambiguously.

Advantageously, the shaft of the inventive moulding device comprises a thread. This thread can be inside the channel of the shaft or on the outside of the shaft. The thread facilitates the connection to a recovery tool and thereby to the removal of the shaft from the tubular member, in case the cast would break during removal from the tubular member.

Preferably, the shaft comprises a flange for abutment of a core. Hereby, the flange secures an appropriate position of the core with relation to the shaft, so that the position of the core inside the chamber, when the moulding device is positioned at least partly inside tubular member, is the required position.

If the shaft of the moulding device is flexible, the moulding device can be used to make a cast of the inner surface of a bend of a tubular member or on both sides of such a bend.

The invention moreover relates to a method of generating a cast of an inner surface of a tubular member, having features and advantages corresponding to the moulding device. One of the main advantages of the method of the invention is that the cast created inside the tubular member is removed from the tubular member by application of a pulling or drawing force. This pulling or drawing force provides a longitudinal extension of the cast (i.e. in the longitudinal direction of the tubular member). This aids in the removal of the cast from the tubular member in that the frictional force between the cast and the tubular member is decreased.

Throughout this description, the term "chamber" is meant to denote a substantially closed volume, the term "cast" is meant to denote cured or hardened moulding material, the terms "draw" and "pull" are used synonymously to denote an exertion of force so as to cause or tend to cause motion toward the force and the term "fluid" is meant to denote any liquid or gas.

BRIEF DESCRIPTION OF THE DRAWINGS

The invention will be explained more fully below in connection with examples of preferred embodiments and with reference to the drawing, in which.

Figure 1A:
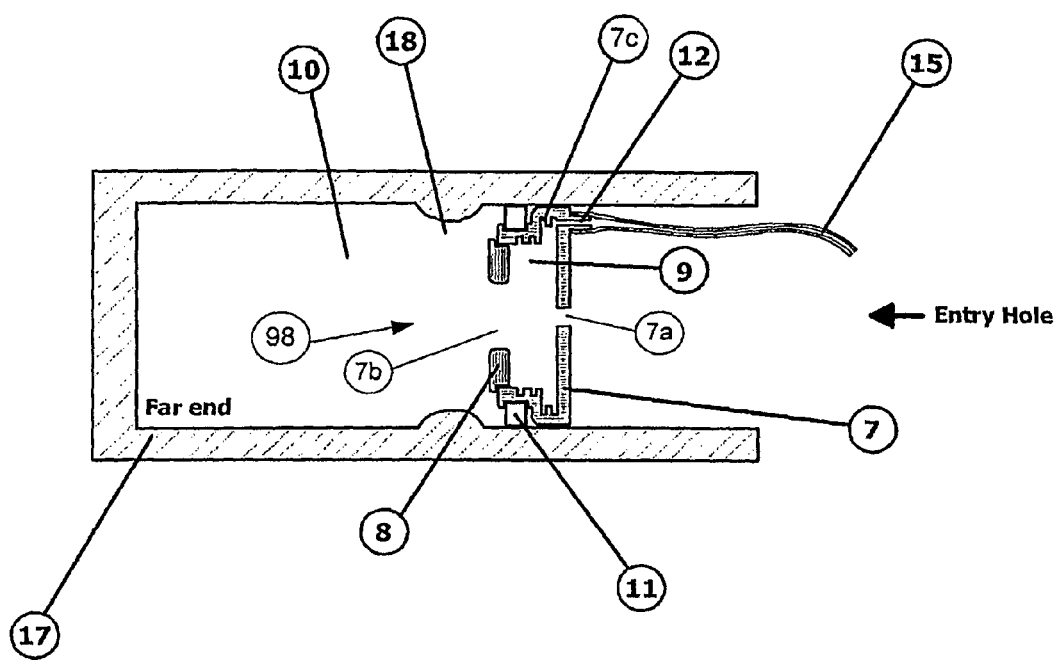
FIG. 1a is a cross section of a moulding device according to the invention, inserted inside a closed, tubular member.

Throughout the figures identical reference numerals denote identical components. Moreover, the orientation of the tubular member is identical throughout the figures; thus in all figures, the moulding device has been inserted and is to be removed through the entry hole of the tubular member, being the opening to the right as seen in the figures.

DESCRIPTION OF PREFERRED EMBODIMENTS

FIG. 1a is a cross section of a moulding device 98 according to the invention, inserted inside a closed, tubular member 17. From FIG. 1a it can be seen, that the moulding device 98 comprises a first closing part comprising a cup part 7 and a lid part 8. The cup part 7 has a first opening 7a and is connected to the lid part, which has a second opening 7b. The cup part 7 of the first closing device seals off against the inner surface of the tubular member 17: In FIG. 1a seal 11 is shown; however, the surface of the cup part 7 could provide sufficient sealing off against the inside of the tubular member 17 to provide a tight seal. The tubular member 17 shown in FIG. 1a is a closed tubular member, so that the tubular member 17 and the moulding device 98 together delimit a chamber 10.

The cup part 7 and the lid part 8 of the first closing part are dimensioned and connected so as to form a cavity 9 in communication with said chamber 10, via the opening 7b in the lid part 8. The connection between the cup part 7 and the lid part 8 of the second closing member is fixed in the sense that the cup part 7 and the lid part 8 only can be detached from each other by means of a tool or by applying a force between the cup part 7 and the lid part 8; however, it should not be possible to disconnect the two parts 7 and 8 simply by applying a pulling or drawing force to the cup part 7. The cup part 7 and the lid part 8 could e.g. be connected to each other by screws or a threaded connection.

The first closing part with the cup part 7 and the lid part 8 is arranged to provide a very stable connection with the cast in order to be able to pull out the cast from the tubular member when a drawing force is applied to the cup part. One or more recesses 7c are arranged in the inner surface of the cup part to fix or secure the part of the cast inside the cavity 9 to the cup part 7. The lid part 8 also enhances the fixation of the cast inside the cavity 9 to the first closing part, so that application of a drawing force to the cup part results in drawing out the complete moulding device and the cast. Application of a drawing or pulling force to the cup part (i.e. in the direction opposite the arrow pointing at the "entry hole" of the tubular member) will thus provide a drawing or pulling force to the cast inside the cavity 9. This force with provide a pulling or drawing of the entire cast from the tubular member.

FIG. 1a also shows that tubular member 17 into which the moulding device 98 is inserted has a section 18 with decreased dimensions. By using a flexible or elastic moulding material it is possible to generate a cast of a tubular member 17 on the remote side (i.e. the left hand side as seen in FIG. 1a) of a section 18 with decreased dimensions, in that cavity 9 renders it possible to generate a part of the cast so that a pulling force applied to this part of the cast facilitates a pulling out of the entire cast, even through such a section 18.

FIG. 1a also shows that the first closing part comprises an outlet 12 connected to an outlet tube 15. This is advantageous if the tubular member is submerged in liquid and/or partly filled by liquid, in that the introduction of moulding material through the opening 7a will push out liquid through the outlet.

Figure 1B:
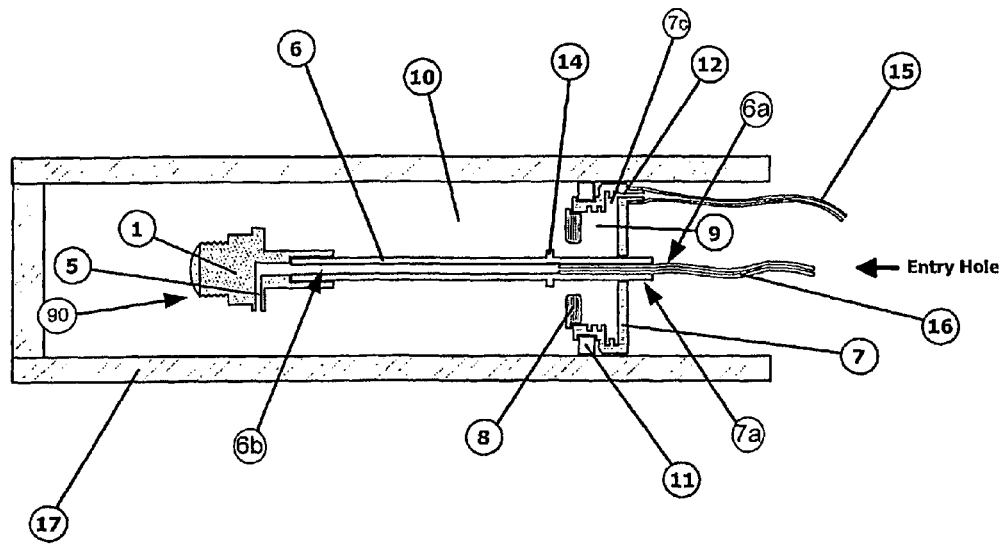
FIGS. 1b and 1c are cross sections of alternative moulding devices according to the invention, inserted inside a closed, tubular member.
Figure 1C:
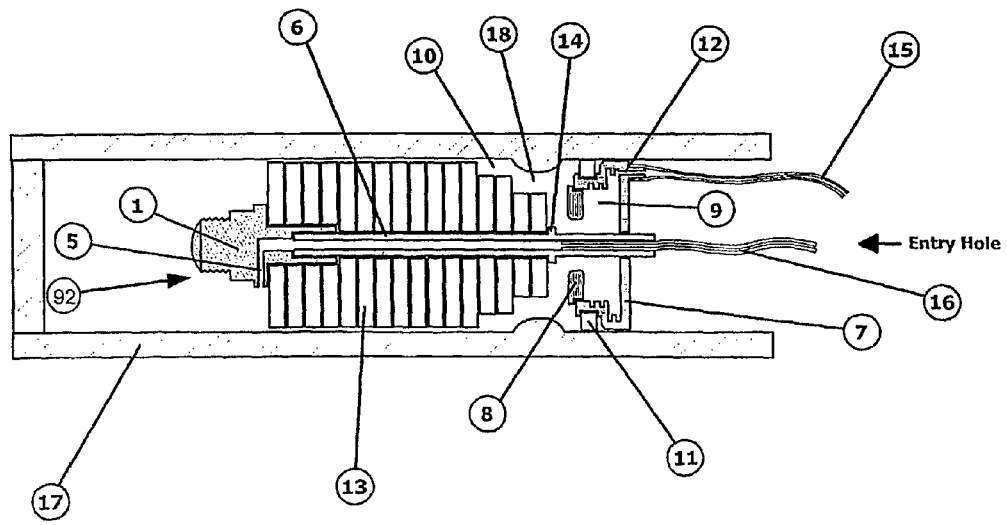

FIGS. 1b and 1c are cross sections of moulding devices 90, 92 according to the invention, inserted inside a closed, tubular member 17. FIG. 1b shows that the moulding device 90 comprises a second closing part 1 having a passageway 5.

The moulding device 90 also comprises a shaft 6 having a channel with two ends 6a, 6b, whereof a first end 6a is arranged to be an inlet for letting moulding material into the channel 6 and whereof a second end 6b is arranged to be an outlet for letting out moulding material from the channel.

The moulding device 90 moreover comprises the first closing part 7, 8 having the cup part 7 and the lid part 8, where the cup part 7 has the opening 7a through which the shaft 6 can slide snugly. The term "slide snugly" is supposed to mean that the shaft 6 abuts against the whole opening 7a, but is arranged to slide inside the opening 7a, e.g. move or glide without the use of tools.

The shaft 6 fits loosely together with the second closing part 1 in such a way that the passageway 5 in the second closing part 1 and the channel of the shaft 6 are in communication. Thus, the shaft 6 is connected to but easily detachable from the second closing part 1.

As FIG. 1*b* shows, the first closing part moreover comprises a sealing member 11 sealing for providing a fluid tight seal between the second cup part 7 of the first closing part and the inside walls of the tubular member 17. It is moreover clear, that the first closing part defines a chamber 10 together with the inside walls of the tubular member 17, when said moulding device 90 is placed inside said tubular member 17.

A cast is formed by introducing moulding material into the chamber 10 (including the cavity 9) and letting it cure for a predetermined amount of time. The moulding material is introduced into the chamber via an inlet tube 16 connected to the channel of the shaft 6. Thus, moulding material is introduced by the inlet tube 16, the channel in the shaft 6 and the passageway 5 of the second closing part 1. After curing of the moulding material into a cast, the cast (not shown in FIG. 1*b*) can be removed from the tubular member 17 by applying a drawing force to the cup part 7 of the first closing part.

Again, the first closing part with the cup part 7 (eventually comprising one or more recesses 7*c*) and the lid part 8 is arranged to provide a very stable connection with the cast in order to be able to pull out the cast from the tubular member when a drawing force is applied to the cup part. Application of a drawing or pulling force to the cup part 7 (i.e. in the direction opposite the arrow pointing at the "entry hole" of the tubular member) will thus provide a drawing or pulling force to the cast inside the cavity 9. This force with provide a pulling or drawing of the entire cast from the tubular member. Since the second closing part 1 and the shaft 6 are inside the chamber 10, the cast connects them together and they will be pulled out of the tubular member 17 together with the first closing part as one piece.

From FIG. 1*b* it can moreover be seen, that the first closing part furthermore comprises an outlet 12. This outlet 12 is arranged for letting out fluid and/or excess moulding mass from the chamber 10. The outlet 12 is placed in that part of the cup part 7 which is arranged to be the substantially uppermost part, when the moulding device 90 is placed at least partly inside the tubular member 17. Hereby, any fluid inside the chamber can be pushed out by introducing moulding mass into the chamber, without the risk of being trapped in a part of the chamber without outlet.

It can moreover be seen, that the passageway 5 of the second closing part 1 is directed downwards. This facilitates the filling up of the chamber 10 by moulding material in a way that the moulding material is introduced into the chamber in the end of the chamber 10 being placed substantially farthest away from the entry hole and into the lower part of the moulding mass. The introduced moulding material fills up the chamber 10 from the bottom to the top thereof, thereby pressing any fluid, i.e. liquid or gas, out through the outlet 12. The moulding device 90 should be placed so that the passageway of the second closing part 1 is placed in the left hand part of the chamber 10 (as seen in of FIG. 1*b*) to ensure that no fluid is trapped in the part of the chamber 10 to the left of the second closing part 1 (as seen in FIG. 1*b*).

The inner dimensions of the tubular member 17 can have any form, such as rectangular, circular, triangular or non-regular. It is just important that the second closing member is able to seal off a chamber in combination with the inner walls of the tubular member.

FIG. 1*c* is a cross section substantially similar to FIG. 1*b*, but showing a moulding device 92 that furthermore comprises a core 13 of flexible material. The core 13 consists of a plurality of discs of flexible material. The chamber 10 delimited by the cup part 7 and the inner walls of the tubular member 17 is now partly taken up by the core 13; however, it should be noted that the core 13 is dimensioned so that it is not in contact with the inner walls of the tubular member 17, when the moulding device 92 is placed inside the tubular member 17 in the position where the casting of the inner walls is to take place.

The discs have openings, so that they can be placed on the shaft 6 or the first closing member 1 and thereby be inserted into the tubular member 17 by the insertion of the first closing member 1 and the shaft into the tubular member 17. A flange 14 on the shaft 6 provides an abutment of the discs to ensure the position thereof.

FIG. 1*c* also shows that the moulding device 92 is now inserted into a closed, tubular member 17 having a section 18 with decreased dimensions. By using a flexible or elastic moulding material it is possible to generate a cast of a tubular member 17 on the remote side (i.e. the left hand side as seen in FIG. 1*c*) of a section 18 with decreased dimensions, in that the inventive concept renders it possible to pull out a cast through such a section 18.

As it can be seen from FIG. 1*c*, the dimensions of the discs 13 vary along the shaft 6, so that the rightmost discs (as seen in FIG. 1*c*) are smaller than the leftmost discs (as seen in FIG. 1*c*). The reduction in diameter of the discs 13 in the direction of the first closing part facilitates to provide an adequate flow of moulding material to the entire chamber, i.e. also to the cavity 9.

It is important that the dimensions of the chamber 10 in the vicinity of the section 18, and that the intervening space between the lid part 8 and the shaft 6 are such, that when the chamber 10 is filled with moulding material which is cured to a cast that is to be removed from the tubular member 17 by pulling the cup part 7, the cast can be pulled out from the tubular member 17 without breaking. However, these dimensions typically depend upon the moulding material used, and therefore might have to be determined experimentally.

The outer dimensions of the discs 13 should be smaller than the inner dimensions of the tubular member 17 (when the moulding device 92 has been placed to generate the cast); however, the outer dimensions of the discs 13 can depend on the required thickness of the generated cast.

Figure 1D:
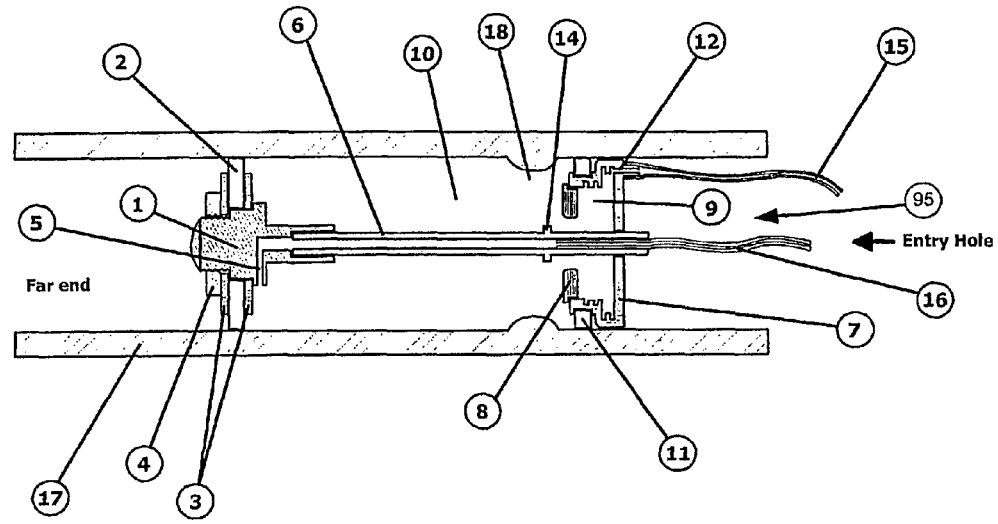
FIGS. 1d and 1e are cross sections of moulding devices according to the invention, inserted inside a tubular member.
Figure 1E:
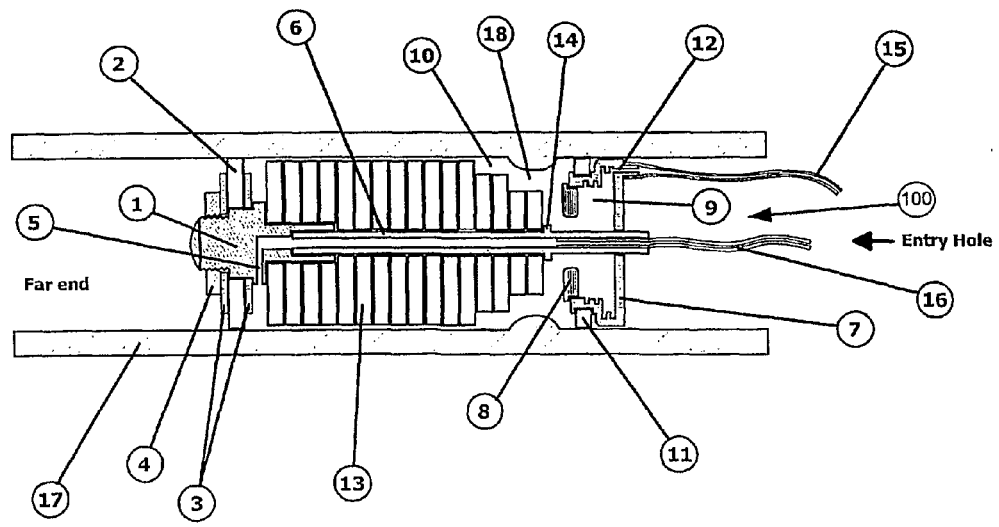

FIGS. 1*d* and 1*e* are cross sections of moulding devices 95, 100 according to the invention, inserted inside a tubular member 17. FIG. 1*d* is similar to FIG. 1*b*, apart from the fact that the moulding device 95 shown in FIG. 1*d* is adapted to generate a cast of a section of a tubular member 17, where the section has two open ends. In FIG. 1*d* these two open ends are denoted "far end" and "entry hole"; the moulding device 95 is inserted into the tubular member 17 and is removed from it via the entry hole.

In the embodiment shown in FIG. 1*d*, the second closing part 1 of the moulding device comprises a seal 2 arranged to seal against the inner surface of the tubular member 17, so that the second closing part 1 with the seal 2 and the cup 7 of the first closing part with its seal 11 seals off a chamber together with the inner surface/walls of the tubular member 17. The seal 2 is fixed to the second closing part 1 by means of two washers 3 and a nut 4 fastened to a thread on the second closing part 1. The seal 2 will preferably be made of a material with sufficient flexibility or elasticity to provide an appropriate sealing against the inner surface of the tubular member and to render it possible to make the seal 2 pass by a section 18 of the tubular member having decreased dimensions. The material of the seal 2 could be any elastic material, such as foamed rubber, which is compatible with the moulding material used. The term "compatible" as used here is meant to denote that the elastic material should not hinder the curing/ hardening of the moulding material and that the elastic material should be able to be fastened to/together with the moulding material during the curing thereof.

FIG. 1e shows a moulding device 100 substantially similar to the moulding device 95 of FIG. 1d, but furthermore comprising a core 13 of flexible material. The core 13 consists of a plurality of discs of flexible material. The chamber 10 delimited by the second closing part 1, the cup part 7 of the first closing part and the inner walls of the tubular member 17 is now partly taken up by the core 13; however, it should be noted that the core 13 is dimensioned so that it is not in contact with the inner walls of the tubular member 17, when the moulding device 95 is placed inside the tubular member 17 in the position where the casting of the inner walls is to take place.

The discs are discs with openings, so that they can be put on the shaft 6 or the first closing member 1 and thereby be inserted into the tubular member 17 by the insertion of the first closing member 1 and the shaft into the tubular member 17. A flange 14 on the shaft 6 provides an abutment of the discs to ensure the position thereof.

The moulding device 100 in FIG. 1e is inserted into an open, tubular member 17 having a section 18 with decreased dimensions. By using a flexible or elastic moulding material it is possible to generate a cast of a tubular member 17 on the remote side (i.e. the left hand side as seen in FIG. 1e) of a section 18 with decreased dimensions, in that the inventive concept renders it possible to pull out a cast through such a section 18.

As it can be seen from FIG. 1e, the dimensions of the discs 13 vary along the shaft 6, so that the rightmost discs (as seen in FIG. 1e) are smaller than the leftmost discs (as seen in FIG. 1e). When the chamber 10 is filled with moulding material which is cured to a cast that is to be removed from the tubular member 17 by pulling the cup part 7, it is important that the dimensions of the chamber 10 in the vicinity of the section 18 are sufficient to avoid breakage of the cast as explained above in connection with FIG. 1c.

Figure 2:
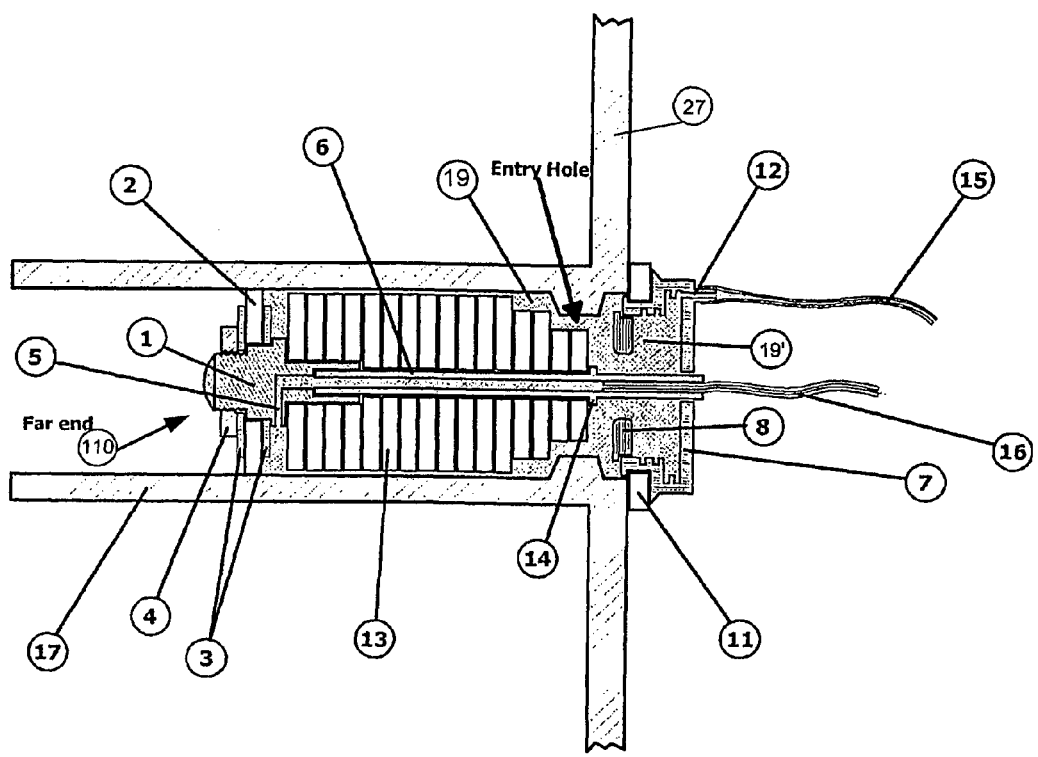
FIG. 2 is a cross section of a moulding device inserted partly inside a tubular member, after filling out the chamber with moulding material.

FIG. 2 is a cross section of a moulding device 110 inserted partly inside a tubular member 17, after filling out the chamber with moulding material 19. The moulding device 110 is arranged to generate a cast of a tubular member 17 extending inwards from a wall 27. To this end, the cup part 7 and the lid part 8 are only partially inserted into the tubular member 17 in the embodiment shown in FIG. 2. The seal 11 abuts against the wall 27 and seals off the cup part 7 from the inside of the tubular member 17.

After insertion of the moulding device 110 into the tubular member 17, moulding mass 19 have been introduced via the inlet tube 16, the channel in the shaft 6 and the passageway 5 into the moulding chamber delimited by the first and second closing part and the inner surface of the tubular member 17. The moulding material 19 fills out the chamber between the core 13 placed on the shaft 6 and on the first closing member 1 and the inside of the tubular member 17. When the moulding material 19 has filled out the left hand side of the chamber (as seen in FIG. 2), it enters the cavity formed by the cup part 7. The moulding material inside this cavity is denoted 19'. Subsequent to filling out this cavity, excess moulding material exits through the outlet 12 placed in the top of the cup part 7 and into the outlet tube 15. During this introduction of moulding material 19, 19', any fluid or gas, that has been present in the chamber, is pressed out of the chamber by the introduction of the moulding material 19, 19'.

Figure 3:
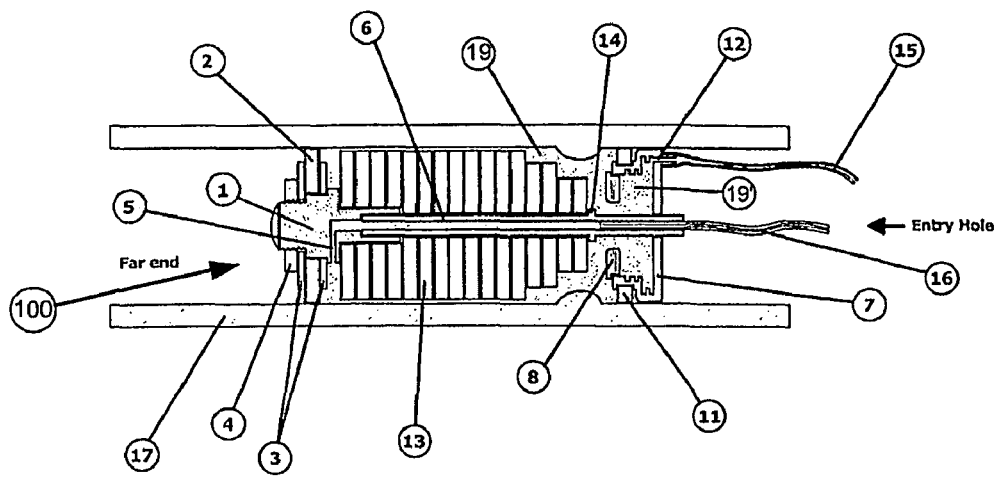
FIG. 3 is a cross section corresponding to FIG. 1e after introduction of moulding material into the chamber.

FIG. 3 is a cross section corresponding to FIG. 1e after introduction of moulding material 19, 19' into the chamber. Again, the reference numeral 19' denotes the part of the cast inside the cavity formed by the cup part 7. When the moulding material has cured to a cast 19, 19', the cast 19' holds the cup part 7, the core 13, the shaft 6 and the second closing part 1 together. When a drawing or pulling force is applied to remove the cup part 7 from the tubular member 17, the shaft 6 detaches from the cup part 7 of the first closing part. Therefore, the cast 19, 19' itself is being pulled from the entry hole side of the tubular member 17. Since the shaft 6 and the second closing part 1 is inside the cast 19, 19', the cast 19, 19' pulls out these parts of the moulding device 100, rather than these parts of the moulding device 100 pushing out the cast. Thus, because the shaft 6 is detached from the first closing part, the cast is being pulled from the outside instead of being pushed from the farthest part of the moulding device, i.e. the second closing part 1. This causes the cast 19, 19' to expand in length (i.e. in the longitudinal direction of the tubular member 17) instead of being compressed, and therefore the cast contracts in its diameter instead of expanding. Hereby, the friction between the cast and the inner surface of the tubular member is decreased, and a safe and easy removal of the cast from the tubular member is achievable. This is also applicable, if tubular member 17 comprises a section 18 with decreased diameter, which section 18 should be passed by a substantial part of the cast 19.

Figure 4:
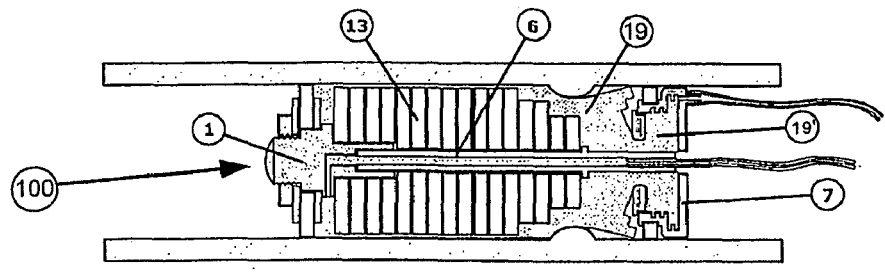
FIGS. 4 to 6 are cross sections corresponding to FIG. 3 during removal of the cast and the moulding device from the tubular member.
Figure 5:
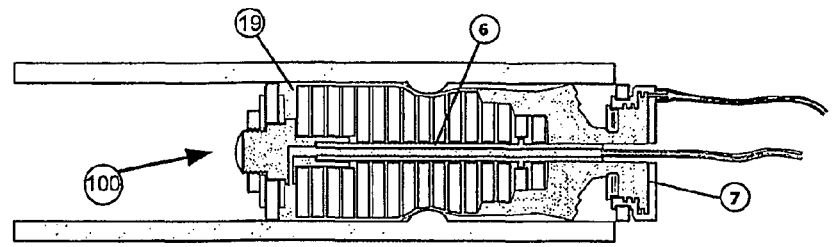
Figure 6:
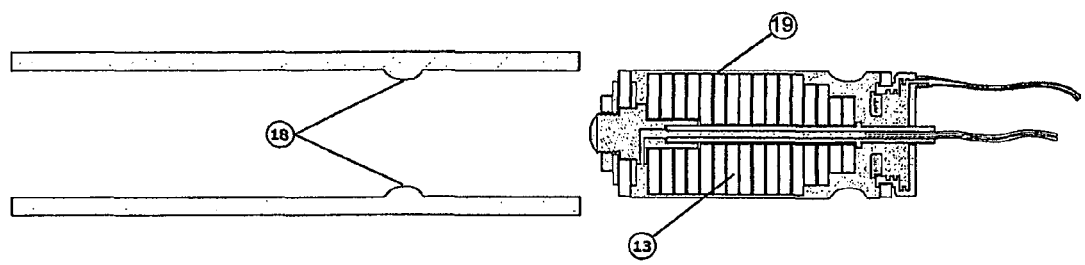

FIGS. 4 to 6 are cross sections corresponding to FIG. 3 during removal of the cast 19, 19' and the moulding device 100 from the tubular member 17. The moulding device 100 and the cast 19, 19' is removed by applying a pulling force to the cup part 7 in the right hand direction as seen in FIGS. 4 to 6. FIG. 4 shows the moulding device 100 and the cast 19, 19' after initial application of the pulling force. It can be seen that part of the cast 19 has been loosened from the inner surface of the tubular member 17. FIG. 5 shows the moulding device 100 and the cast 19, 19', when they have been moved along the tubular member 17. It can be seen that the contact between the cast 19 and the inner surface of the tubular member to the right (as seen in FIG. 5) of the section with decreased diameter has been loosened substantially. Moreover, it can be seen that the discs of the core 13 are slightly separated. Thus, the discs of the core 13 provide enhanced flexibility and facilitate an increase in the expansion of the cast 19 in its longitudinal direction and the contraction of the diameter of the cast 19. This renders it possible to pull out the cast 19 through a section of decreased dimensions compared to the dimensions of the cast 19. FIG. 6 shows the moulding device 100 and the cast after removal from the tubular member.

Figure 7:
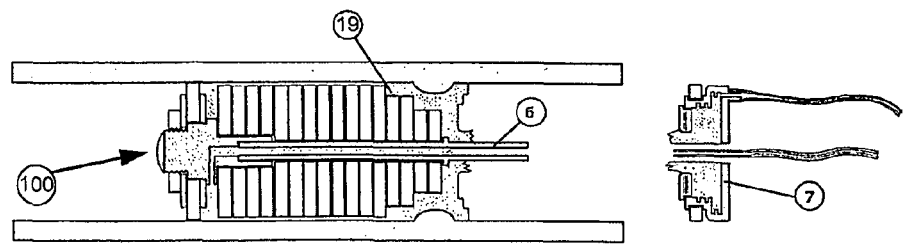
FIGS. 7 to 9 are drawings corresponding to FIG. 4 in a case where part of the cast has broken off from the remainder of the cast.
Figure 8:
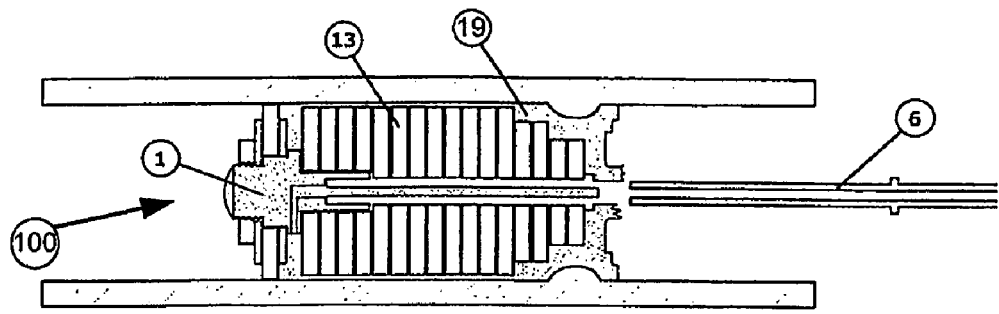
Figure 9:
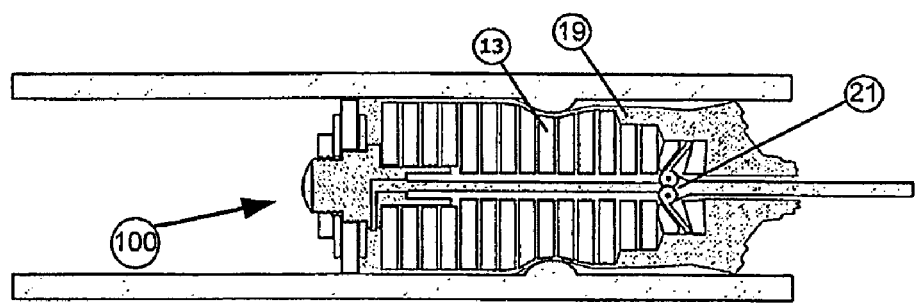

FIGS. 7 to 9 are a drawing corresponding to FIG. 4 in a case where part of the cast has broken off from the remainder of the cast for some reason. FIG. 7 shows that the cup part 7 has been separated from the shaft 6 and has been removed from the tubular member. The remainder of the moulding device 100 has stayed inside the tubular member. The shaft 6 extends beyond the cast 19 inside the tubular member. Since the shaft 6 fits loosely together with the second closing part 1 of the moulding device 100 and since the shaft 6 is positioned inside the core 13 and therefore is not bonded to the cast, the shaft 6 can easily be removed from the tubular member, as shown in FIG. 8. As mentioned, the shaft 6 could have an inner or outer thread to facilitate attachment of a tool to the shaft, so that the shaft 6 can be removed by pulling out the tool attached to the shaft 6.

FIG. 9 shows the cast inside the tubular member subsequent to the removal of the shaft. Since the shaft of the moulding device has been removed from the cast 19, the cast 19 and its very flexible core 13 become remarkable easy to pull out due to its increased flexibility. If the cast 19 can be reached by a hand of an operator, it can be pulled by hand.

Alternatively a recovery tool 21 can be inserted into a cavity left by the shaft 6 and in between two discs of the core 13. Subsequently, the cast 19 and the remainder of the moulding device 100 can be removed by pulling the recovery tool 21.

Figure 10:
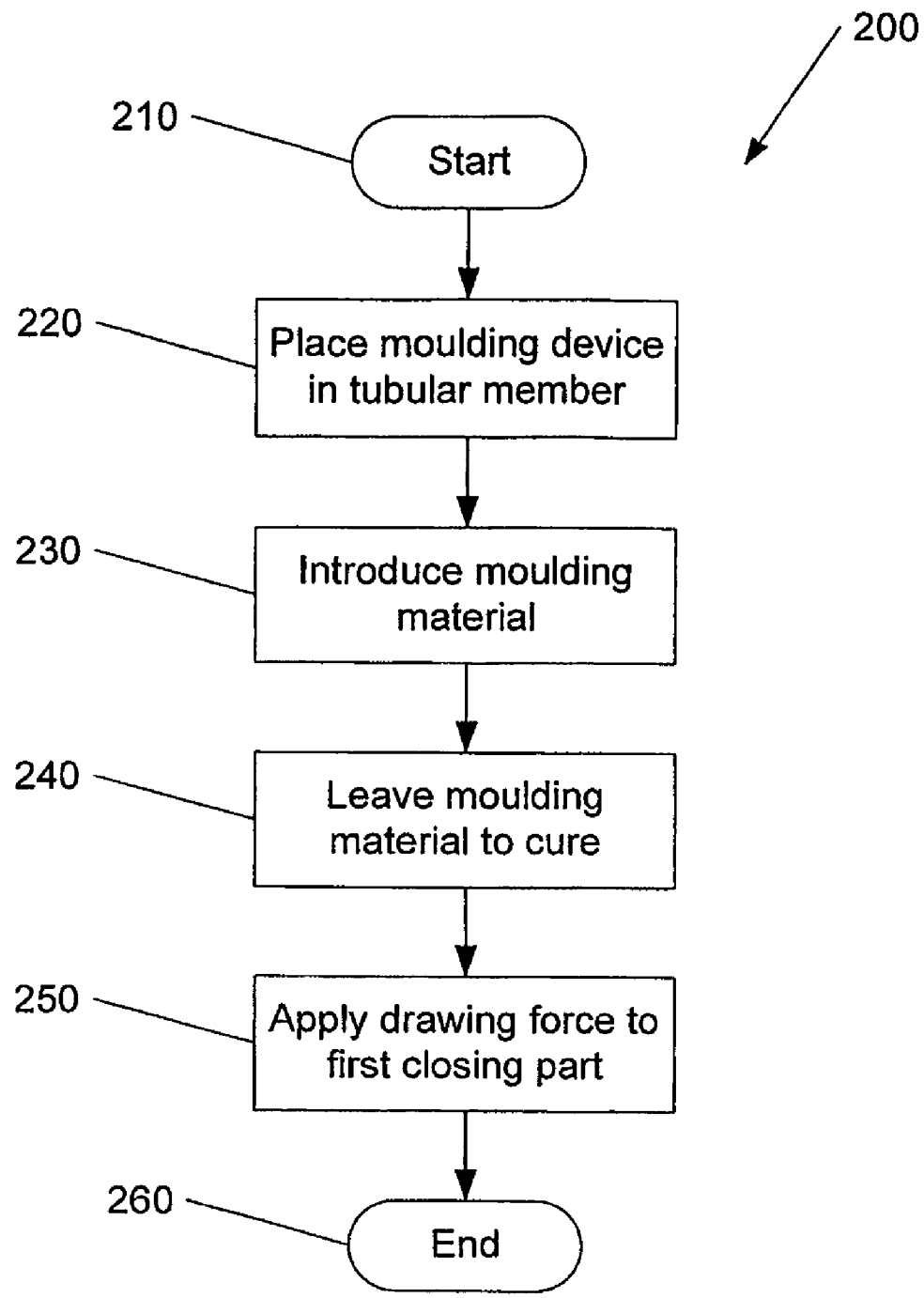
FIGS. 10 and 11 are flow charts of methods of generating a cast of an inner surface of a tubular member.

FIG. 10 is a flow chart of a method 200 of generating a cast of an inner surface of a tubular member. The flow starts in step 210 and continues to step 220, where the moulding device 90, 92, 95, 98, 100 or 110 is placed at least partly inside a tubular member. If a moulding device 90, 92, 95, 100 or 110 comprising a second closing part and a shaft is used, this second closing part is placed inside the tubular member and the first closing part and the shaft of the moulding device are placed inside or partly inside the tubular member. If a moulding device 98 is used in connection with a closed, tubular member 17, the first closing part is placed at least partly inside a tubular member.

When the tubular member 17 is partly or completely filled with a liquid, the first closing part should be positioned so that the outlet 12 (if any) is placed substantially in the uppermost part of the first closing part. Hereby, it is ensured that the liquid present in the tubular member 17 escapes from the tubular member 17 during filling up thereof by means of moulding material, without any liquid being trapped inside the tubular member.

In the next step, step 230, moulding material is introduced into the chamber formed by means of the moulding device and the inner surface of the tubular member. The moulding material is introduced via the channel in the shaft 6 and via the passageway 5 in the second closing part. Subsequently, in step 240, the moulding material is left to cure for predetermined period of time. This predetermined period of time can be any appropriate period of time sufficient to let the material cure.

In the next step, step 250, a drawing force is applied to the first closing part of the moulding device so as to remove the cast and the moulding device from the tubular member. In step 250, it is assumed that the drawing force applied can be increased until it is sufficient to draw out the moulding device or at least some of it from the tubular member. The method ends in the subsequent step, step 260.

Figure 11:
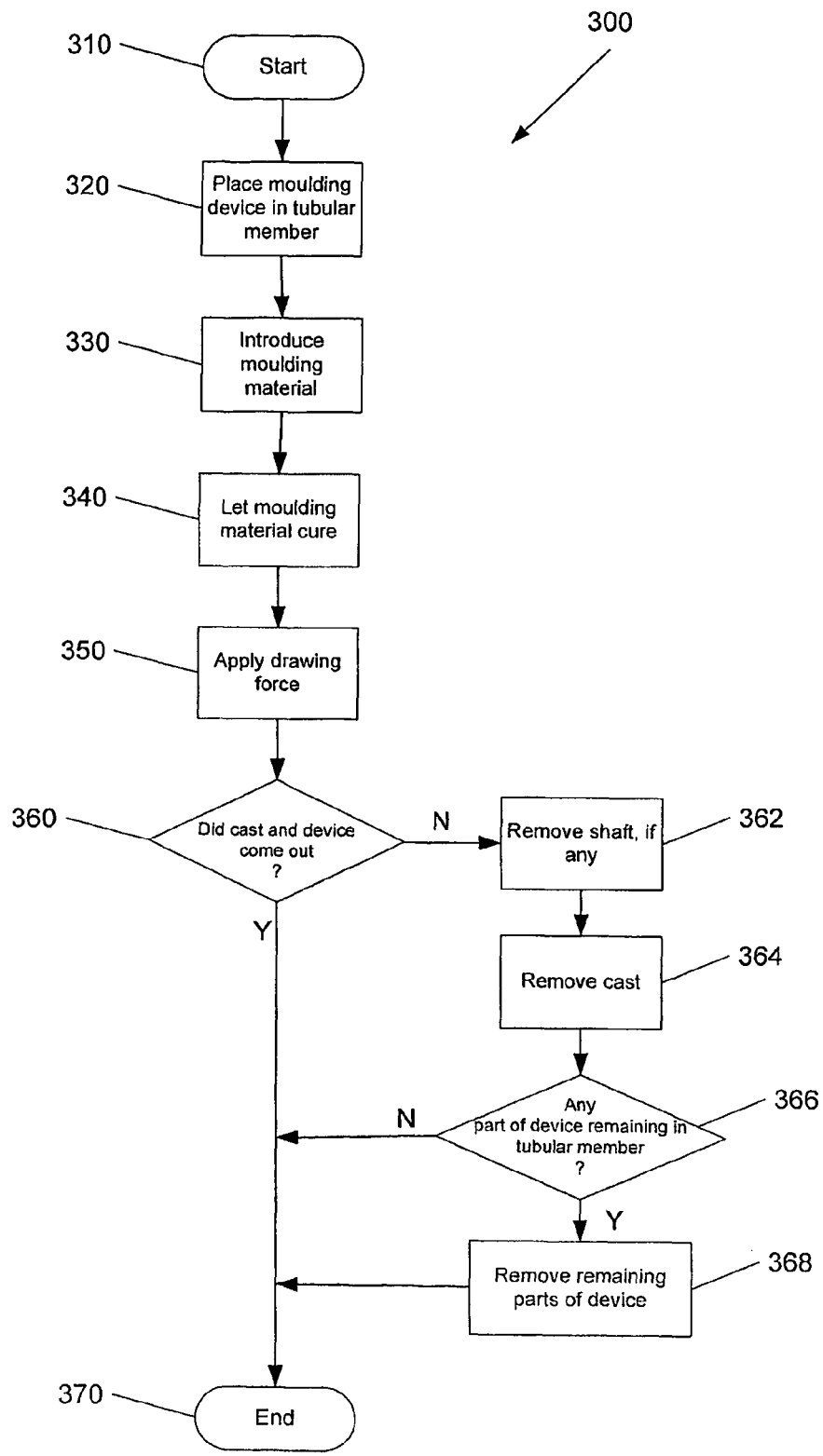

FIG. 11 is a flow chart of a method 300 of generating a cast of an inner surface of a tubular member. The steps 310 to 350 of the method 300 corresponds to the steps 210 to 250 of the method 200 and will therefore not be described here.

In step 360, following after step 350, it is checked whether the moulding device and the cast did come out in one piece, in that it is possible that the cast could break off during the application of a drawing force to the first closing part of the moulding device. If it is determined in step 360 that the complete moulding device was removed from the tubular member together with the complete cast, the method 300 terminates in step 370. In the opposite case, i.e. when only part of the moulding device and part of the cast was removed from the tubular member and the remainder has stayed inside of it (see FIG. 7), the method continues to step 362, where the shaft 6, if any, is removed from the tubular member. In case of a moulding device 98 without a shaft, this method step is not applicable and is skipped.

The shaft 6 can be provided with means for fastening of a recovery tool, e.g. a thread for fastening of a threaded recovery tool, an eye or opening for insertion of a part of the recovery tool. However, since the shaft is only loosely connected to the second closing part of the moulding device and since it is not bonded to the cast, the shaft can be removed from the second closing part and the cast by application of a relatively small drawing force and could therefore be removed by hand.

Subsequently, in step 364, the cast is removed from the tubular member. Since the shaft 6 has been removed, the flexible cast and its even more flexible core, if any, can be removed from the tubular member by application of a relative weak drawing force. If the cast can be accessed by the hand of an operator, it will typically be possible to remove it by hand. In the opposite case, a recovery tool (see FIG. 9) can be inserted into the space previously taken up by the shaft and be fastened to the core or to the cast itself. An appropriate drawing force applied to the recovery tool will then provide the removal of the parts of the cast, which was left inside the tubular member.

In the subsequent step 366, it is checked whether any part of the moulding device has remained inside the tubular member after removal of the cast. If this is not the case, the method continues to step 370, where it ends. If any part of the moulding device has remained inside the tubular member after removal of the cast, it is removed in step 368. This removal is typically performed by attaching a recovery tool to the remaining part and applying a drawing or pulling force to this part. However, it should be noted that this step 368 is not necessary, in that it is possible to leave the remaining part of the moulding device inside the tubular member. The method subsequently ends in step 370.

In the above, the term "drawing force" is meant to denote a force applied in a direction able to draw out the moulding device/cast from the tubular member, typically in the opposite direction compared to the direction in which the moulding device was inserted into the tubular member. In the Figures, such a drawing force will be a force directed substantially to the right of the Figures.

It should be noted, that the moulding material used could be any suitable material, such as for example CopyRite®. The density of the moulding material should be, and typically automatically will be, greater than the density of any fluid present around the component to be investigated, so that the fluid forced away by the moulding material introduced into the moulding chamber will flow upwards and out through the at least one outlet. However, it is conceivable, that the density of the fluid would be greater than that of the moulding material. In this case, the inlet should be in the upper part of the moulding chamber and at any substantial indentation an outlet should be present in the lower part thereof. Moreover, the material used for the core could be any material with high flexibility/elasticity, e.g. foamed material, which is compatible with the moulding material used. Preferably, the core material is chosen to be a material with higher flexibility/elasticity than the cured moulding material, so that the presence of the core in the cast enhances the flexibility/elasticity thereof.

REFERENCE NUMERALS

1 Second closing part
2 seal
3 washer
4 nut
5 passageway
6 shaft
6a,b first and second end of shaft
7 cup part
7a first opening (in cup part)
7b second opening (in lid part)
7c recess (in first closing part)
8 lid part
7+8: first closing part
9 cavity 10 chamber
11 seal
12 outlet
13 core of flexible material
14 flange
15 outlet tube
16 inlet tube
17 tubular member
18 part of tubular member having decreased dimensions
19 cast (in chamber 10)
19' cast (in cavity 9)
21 recovery tool
90, 92, 95, 98, 100, 110 Moulding device (different embodiments)

The invention claimed is:

1. A moulding device (90; 92; 95; 98; 100; 110) suitable for use in a tubular member (17),
   comprising:
   a first closing part (7, 8) with a first opening (7a); and
   said first closing part (7; 8) is arranged to be placed at least partly inside said tubular member (17) and to seal against the inside of the tubular member (17) in its position at least partly inside said tubular member (17) such as to delimit a chamber (10):
   wherein
   said first closing part (7, 8) defines a cavity (9) comprising said first opening (7a) and a second opening (7b), where said first and second openings (7a, 7b) are placed on opposite sides of the first closing part (7, 8);
   wherein the first closing part (7, 8) comprises a cup part (7) having said first opening, (7a) and a lid part (8) having said second opening (7b), where said lid part (8) is arranged to be connected to the cup part (7), so that the cup part (7) and the lid part (8) together form said cavity (9); and
   wherein said cavity (9) is in communication with said chamber (10) via the opening (7b) in the lid part (8) such that a cast is formed by introducing moulding material into the chamber (10) including the cavity (9).

2. A moulding device (90; 92; 95; 98; 100; 110) according to claim 1 wherein said cup part (7) comprises at least one recess (7c).

3. A moulding device (90; 92; 95; 98; 100; 110) according to claim 1, further comprising
   a second closing part (1) arranged to be placed inside said tubular member (17) and comprising a passageway (5); and
   a shaft (6) arranged to be placed at least partly inside said tubular member (17) and comprising a channel with two ends (6a, 6b),
   whereof a first end (6a) is arranged to be an inlet for letting moulding material into the channel (6) and whereof a second end (6b) is arranged to be an outlet for letting out moulding material from the channel,
   wherein said shaft (6) is arranged to fit loosely together with said second closing part (1) so that said passageway (5) and said channel are in communication,
   wherein said shaft (6) is capable of sliding snugly through said first opening (7a) of said first closing part (7, 8), and wherein said shaft (6) is capable of passing through said second opening (7b) of said first closing part (7, 8) leaving an intervening space between said second opening (7b) and said shaft (6).

4. A moulding device (90; 92; 95; 98; 100; 110) according to claim 3, wherein said first and second closing parts (1; 7, 8) in combination or said first closing part (7, 8) are/is arranged to define a chamber (10) together with the inside of the tubular member (17), when said moulding device (90; 92; 95; 98; 100; 110) is placed at least partly inside said tubular member (17).

5. A moulding device (90; 92; 95; 98; 100; 110) according claim 1 further comprising a core (13) of flexible material arranged to be placed inside said tubular member (17).

6. A moulding device (90; 92; 95: 98; 100; 110) according to claim 5, wherein said core (13) comprises a plurality of discs.

7. A moulding device (90; 92; 95; 98; 100; 110) according to claim 1, wherein said first closing part (7, 8) comprises an outlet (12) arranged for letting out fluid and/or excess moulding mass.

8. A moulding device (90; 92; 95; 98; 100; 110) according to claim 1, wherein said first closing part (7, 8) moreover comprises a test piece with a surface defect having well known characteristics.

9. A moulding device (90; 92; 95; 98; 100; 110) according to claim 1, wherein said first closing part (7, 8) moreover comprises a mark arranged for generating an imprint on a cast (19) to indicate the orientation of the moulding device (90, 92, 95, 100, 110) with relation to a known orientation.

10. A moulding device (90; 92; 95; 98; 100; 110) according to claim 3, wherein the channel of the shaft (6) comprises a thread.

11. A moulding device (90; 92: 95; 98; 100; 110) according claim 3, wherein the shaft (6) comprises a flange (14) for abutment of said core (13).

12. A moulding device (90; 92; 95: 98; 100; 110) according to claim 3, wherein the shall (6) is flexible.

* * * * *